United States Patent [19]

Amano

[11] 4,421,390
[45] Dec. 20, 1983

[54] BRIGHT WIDE-ANGLE LENS FOR COMPACT COLOR VIDEO CAMERAS

[75] Inventor: Kyosuke Amano, Kurume, Japan

[73] Assignee: Asahi Kagaku Kogyo Kabushiki Kaisha, Tokyo, Japan

[21] Appl. No.: 223,535

[22] Filed: Jan. 8, 1981

[30] Foreign Application Priority Data

Feb. 5, 1980 [JP] Japan .................................. 55-12807

[51] Int. Cl.³ ........................ G02B 9/64; G02B 13/04
[52] U.S. Cl. .................................................. 350/459
[58] Field of Search .............................. 350/458, 459

[56] References Cited

U.S. PATENT DOCUMENTS 3,736,049  5/1973  Shimizu ............................... 350/459
4,158,482  6/1979  Doi et al. ............................ 350/459

*Primary Examiner*—John K. Corbin
*Assistant Examiner*—R. Gass
*Attorney, Agent, or Firm*—Sughrue, Mion, Zinn, Macpeak and Seas

[57] ABSTRACT

A wide-angle lens system for compact color video cameras composed of nine lenses grouped in eight lens components. A first lens component includes a negative meniscus lens convex toward the object, a second lens component includes a positive meniscus lens concave toward the object, a third lens component includes a negative meniscus lens convex toward the object, a fourth lens component includes a positive cemented lens composed of a positive lens and a negative lens, a fifth lens component includes a positive lens, a sixth lens component includes a negative lens, a seventh lens component includes a positive lens and an eighth lens component includes a positive lens.

3 Claims, 6 Drawing Figures

BRIGHT WIDE-ANGLE LENS FOR COMPACT COLOR VIDEO CAMERAS

BACKGROUND OF THE INVENTION

The present invention relates to a wide-angle lens for compact color video cameras.

Recently, compact color video cameras have widely been used in various fields. Also, wide-angle lenses therefor have increasingly been used. If a prior art lens intended for use with an industrial monochrome camera were attempted to be used instead with a color video camera, since the backfocus of such a wide-angle lens is short, it is normally impossible to mount it on a color video camera due to the presence of filters or the like mounted on the front portion of the television camera tube of the camera. Even if the wide-angle lens can be mounted on a particular camera, since the exit pupil position of the prior art wide-angle lens is near the focal plane, non-uniformity of color is inherently generated. Therefore, there is a great demand for a video camera lens in which the non-uniformity of color is negligible and which is suitable for a television camera tube used in a color camera.

SUMMARY OF THE INVENTION

Accordingly, the present invention provides a wide-angle lens for compact color video cameras in which the aperture ratio is bright at 1:1.4, the backfocus is 1.75 times longer than the overall focal length, and various aberrations are compensated for to make the lens compatible with a color television camera tube.

Specifically, the present invention provides a wide-angle lens system for compact color video cameras composed of nine lens components grouped in eight lens components. A first lens component includes a negative meniscus lens convex toward the object, a second lens component includes a positive meniscus lens concave toward the object, a third lens component includes a negative meniscus lens convex toward the object, a fourth lens component includes a positive cemented lens composed of a positive lens and a negative lens, a fifth lens component includes a positive lens, and a sixth lens component includes a negative lens, a seventh lens component includes a positive lens and an eighth lens component includes a positive lens.

BRIEF DESCRIPTION OF THE DRAWINGS

The present invention will be described with reference to the drawings in which.

DESCRIPTION OF THE PREFERRED EMBODIMENTS

Figure 1:
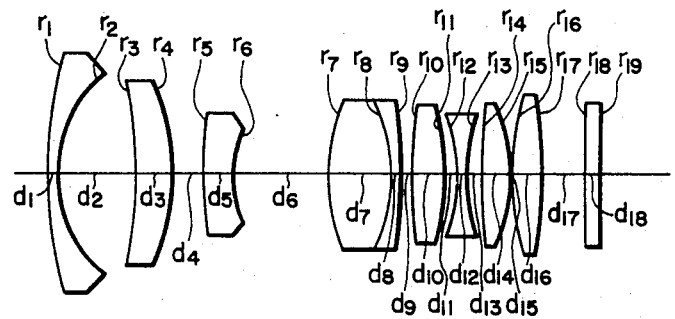
FIG. 1 is a cross-sectional view showing a lens of the present invention according to an Example 1.
Figure 2:
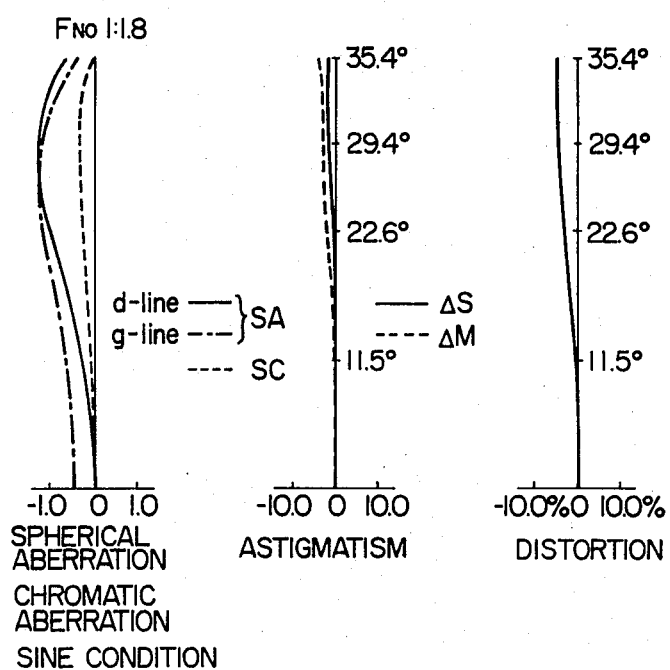
FIG. 2 is a graph showing various aberration curves for the lens of FIG. 1.
Figure 3:
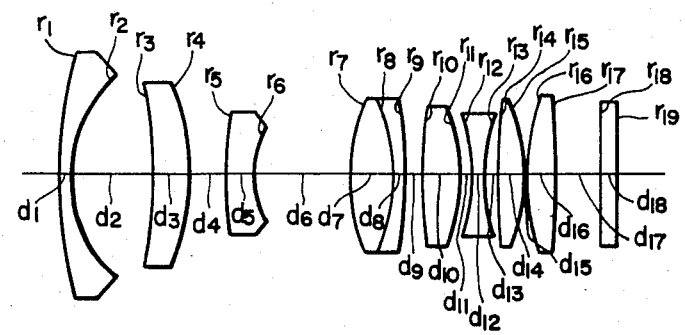
FIG. 3 is a cross-sectional view showing a lens of the invention according to an Example 2.
Figure 4:
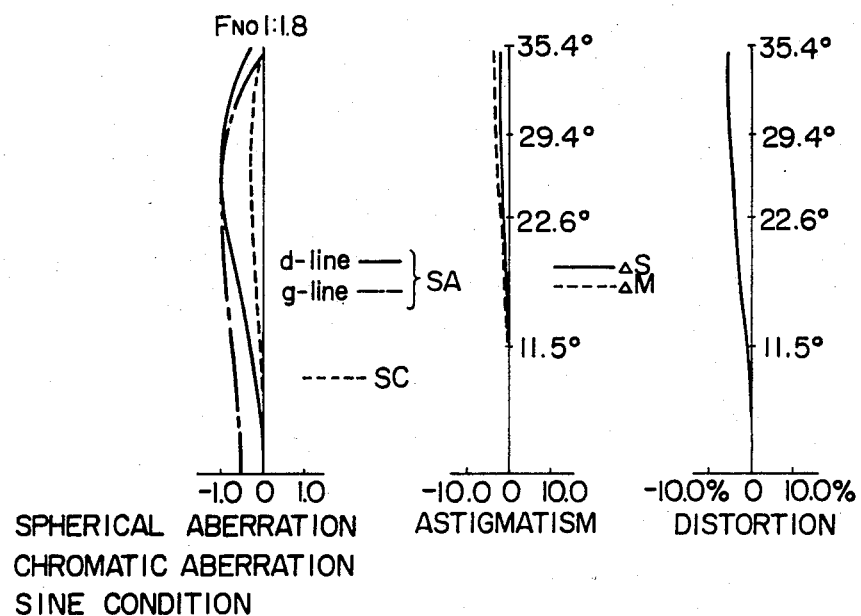
FIG. 4 is a graph showing various aberration curves for the lens of FIG. 3.
Figures 5, 6:
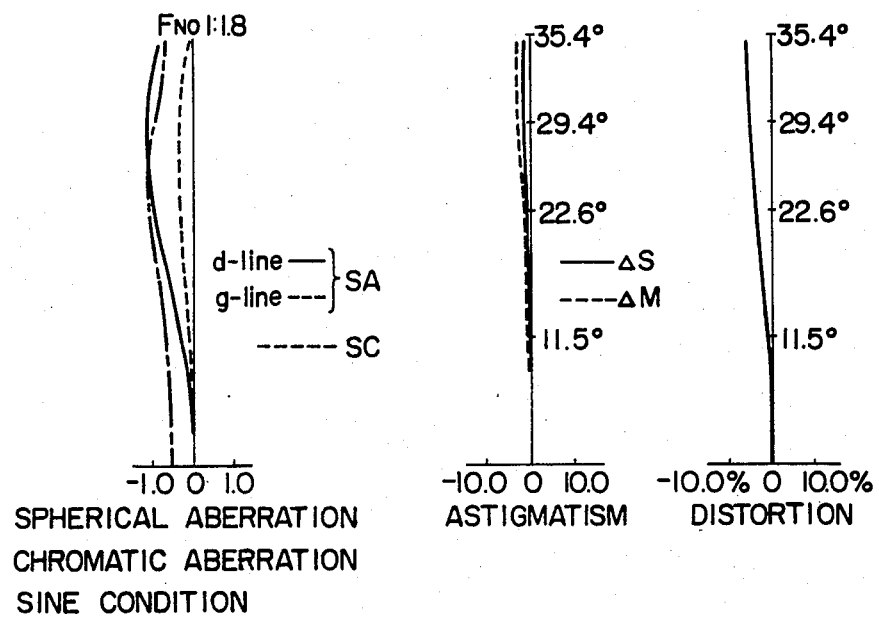
FIG. 5 is a cross-sectional view showing a lens of the invention according to an Example 3.
FIG. 6 is a graph showing various aberration curves for the lens of FIG. 3.

Specific examples of lenses according to the invention will be described in which: $r_1, r_2, \ldots r_{19}$ is the radius of curvature of each lens surface; $d_1, d_2, \ldots d_{18}$ is the lens thickness or the distance between the respective adjacent lenses; $N_1, N_2, \ldots N_{10}$ is the refractive index of each lens, $\nu_1, \nu_2, \ldots \nu_{10}$ is the Abbe number of each lens, and * is the face plate of the television camera tube. Note that the value of backfocus is calculated without the face plate.

EXAMPLE 1

Aperture ratio 1:1.4 F=100 View angle 70.8°

| | | | | | | |
|---|---|---|---|---|---|---|
| $r_1$ | 470.236 | $d_1$ | 15.97 | $N_1/\nu_1$ | 1.62230/53.2 |
| $r_2$ | 155.922 | $d_2$ | 104.44 | | |
| $r_3$ | −649.982 | $d_3$ | 49.95 | $N_2/\nu_2$ | 1.80518/25.4 |
| $r_4$ | −297.714 | $d_4$ | 49.15 | | |
| $r_5$ | 535.971 | $d_5$ | 36.86 | $N_3/\nu_3$ | 1.61800/63.4 |
| $r_6$ | 113.778 | $d_6$ | 131.96 | | |
| $r_7$ | 217.689 | $d_7$ | 86.01 | $N_4/\nu_4$ | 1.70514/41.2 |
| $r_8$ | −190.178 | $d_8$ | 14.01 | $N_5/\nu_5$ | 1.71736/29.5 |
| $r_9$ | −565.632 | $d_9$ | 15.36 | | |
| $r_{10}$ | 841.143 | $d_{10}$ | 44.60 | $N_6/\nu_6$ | 1.65830/53.4 |
| $r_{11}$ | −260.312 | $d_{11}$ | 16.46 | | |
| $r_{12}$ | −172.018 | $d_{12}$ | 13.52 | $N_7/\nu_7$ | 1.80518/25.4 |
| $r_{13}$ | 218.193 | $d_{13}$ | 20.89 | | |
| $r_{14}$ | 801.641 | $d_{14}$ | 38.09 | $N_8/\nu_8$ | 1.67790/55.3 |
| $r_{15}$ | −200.659 | $d_{15}$ | 1.23 | | |
| $r_{16}$ | 276.716 | $d_{16}$ | 37.60 | $N_9/\nu_9$ | 1.74400/44.7 |
| $r_{17}$ | −880.978 | $d_{17}$ | 61.44 | | |
| *$r_{18}$ | ∞ | $d_{18}$ | 20.89 | $N_{10}/\nu_{10}$ | 1.49782/66.8 |
| $r_{19}$ | ∞ | | | | |

$F_{1 \cdot 2 \cdot 3} = -158.900$
Backfocus = 179.002

EXAMPLE 2

Aperture ratio 1:1.4 F=100 View angle 70.8°

| | | | | | | |
|---|---|---|---|---|---|---|
| $r_1$ | 473.112 | $d_1$ | 15.96 | $N_1/\nu_1$ | 1.62230/53.2 |
| $r_2$ | 155.514 | $d_2$ | 108.65 | | |
| $r_3$ | −642.428 | $d_3$ | 47.93 | $N_2/\nu_2$ | 1.80518/25.4 |
| $r_4$ | −299.300 | $d_4$ | 49.98 | | |
| $r_5$ | 536.562 | $d_5$ | 35.54 | $N_3/\nu_3$ | 1.61800/63.4 |
| $r_6$ | 113.590 | $d_6$ | 132.26 | | |
| $r_7$ | 219.348 | $d_7$ | 61.40 | $N_4/\nu_4$ | 1.70514/41.2 |
| $r_8$ | −190.279 | $d_8$ | 14.00 | $N_5/\nu_5$ | 1.71736/29.5 |
| $r_9$ | −568.478 | $d_9$ | 25.52 | | |
| $r_{10}$ | 845.859 | $d_{10}$ | 48.65 | $N_6/\nu_6$ | 1.65830/53.4 |
| $r_{11}$ | −260.729 | $d_{11}$ | 16.50 | | |
| $r_{12}$ | −171.576 | $d_{12}$ | 13.51 | $N_7/\nu_7$ | 1.80518/25.4 |
| $r_{13}$ | 216.668 | $d_{13}$ | 18.85 | | |
| $r_{14}$ | 807.545 | $d_{14}$ | 37.74 | $N_8/\nu_8$ | 1.67790/55.3 |
| $r_{15}$ | −200.434 | $d_{15}$ | 1.23 | | |
| $r_{16}$ | 276.116 | $d_{16}$ | 37.45 | $N_9/\nu_9$ | 1.74400/44.7 |
| $r_{17}$ | −827.598 | $d_{17}$ | 61.40 | | |
| *$r_{18}$ | ∞ | $d_{18}$ | 20.88 | $N_{10}/\nu_{10}$ | 1.49782/66.8 |
| $r_{19}$ | ∞ | | | | |

$F_{1 \cdot 2 \cdot 3} = -155.786$
Backfocus = 179.381

EXAMPLE 3

Aperture ratio 1:1.4 F=100 View angle 70.8°

| | | | | | | |
|---|---|---|---|---|---|---|
| $r_1$ | 473.541 | $d_1$ | 15.96 | $N_1/\nu_1$ | 1.62230/53.2 |
| $r_2$ | 155.895 | $d_2$ | 108.13 | | |
| $r_3$ | −639.702 | $d_3$ | 51.44 | $N_2/\nu_2$ | 1.80518/25.4 |
| $r_4$ | −301.437 | $d_4$ | 52.10 | | |
| $r_5$ | 543.943 | $d_5$ | 35.46 | $N_3/\nu_3$ | 1.61800/63.4 |
| $r_6$ | 114.155 | $d_6$ | 131.33 | | |
| $r_7$ | 217.565 | $d_7$ | 77.41 | $N_4/\nu_4$ | 1.70514/41.2 |
| $r_8$ | −191.629 | $d_8$ | 14.00 | $N_5/\nu_5$ | 1.71736/29.5 |
| $r_9$ | −549.137 | $d_9$ | 14.15 | | |
| $r_{10}$ | 841.499 | $d_{10}$ | 43.48 | $N_6/\nu_6$ | 1.65830/53.4 |
| $r_{11}$ | −259.440 | $d_{11}$ | 10.96 | | |

-continued

| | | | | | |
|---|---|---|---|---|---|
| $r_{12}$ | −172.252 | $d_{12}$ | 21.32 | $N_7/\nu_7$ | 1.80518/25.4 |
| $r_{13}$ | 217.516 | $d_{13}$ | 22.13 | | |
| $r_{14}$ | 816.840 | $d_{14}$ | 37.61 | $N_8/\nu_8$ | 1.67790/55.3 |
| $r_{15}$ | −200.680 | $d_{15}$ | 1.23 | | |
| $r_{16}$ | 271.327 | $d_{16}$ | 37.20 | $N_9/\nu_9$ | 1.74400/44.7 |
| $r_{17}$ | −1152.429 | $d_{17}$ | 61.40 | | |
| *{ $r_{18}$ | ∞ | $d_{18}$ | 20.89 | $N_{10}/\nu_{10}$ | 1.49782/66.8 |
| $r_{19}$ | ∞ | | | | |

$F_{1\cdot 2\cdot 3} = -155.188$
Backfocus = 181.980

What is claimed is:

1. A wide-angle lens system comprising nine lenses grouped in eight lens components, a first lens component including a negative meniscus lens convex toward the object, a second lens component including a positive meniscus lens concave toward the object, a third lens component including a negative mensicus lens convex toward the object, a fourth lens component including a positive cemented lens composed of a positive lens and a negative lens, a fifth lens component including a positive lens, a sixth lens component including a negative lens, a seventh lens component including a positive lens, and an eighth lens component including a positive lens wherein:

Aperture ratio 1:1.4 F=100 View angle 70.8°

| | | | | | |
|---|---|---|---|---|---|
| $r_1$ | 470.236 | $d_1$ | 15.97 | $N_1/\nu_1$ | 1.62230/53.2 |
| $r_2$ | 155.922 | $d_2$ | 104.44 | | |
| $r_3$ | −649.982 | $d_3$ | 49.95 | $N_2/\nu_2$ | 1.80518/25.4 |
| $r_4$ | −297.714 | $d_4$ | 49.15 | | |
| $r_5$ | 535.971 | $d_5$ | 36.86 | $N_3/\nu_3$ | 1.61800/63.4 |
| $r_6$ | 113.778 | $d_6$ | 131.96 | | |
| $r_7$ | 217.689 | $d_7$ | 86.01 | $N_4/\nu_4$ | 1.70514/41.2 |
| $r_8$ | −190.178 | $d_8$ | 14.01 | $N_5/\nu_5$ | 1.71736/29.5 |
| $r_9$ | −565.632 | $d_9$ | 15.36 | | |
| $r_{10}$ | 841.143 | $d_{10}$ | 44.60 | $N_6/\nu_6$ | 1.65830/53.4 |
| $r_{11}$ | −260.312 | $d_{11}$ | 16.46 | | |
| $r_{12}$ | −172.018 | $d_{12}$ | 13.52 | $N_7/\nu_7$ | 1.80518/25.4 |
| $r_{13}$ | 218.193 | $d_{13}$ | 20.89 | | |
| $r_{14}$ | 801.641 | $d_{14}$ | 38.09 | $N_8/\nu_8$ | 1.67790/55.3 |
| $r_{15}$ | −200.659 | $d_{15}$ | 1.23 | | |
| $r_{16}$ | 276.716 | $d_{16}$ | 37.60 | $N_9/\nu_9$ | 1.74400/44.7 |
| $r_{17}$ | −880.978 | $d_{17}$ | 61.44 | | |
| *{ $r_{18}$ | ∞ | $d_{18}$ | 20.89 | $N_{10}/\nu_{10}$ | 1.49782/66.8 |
| $r_{19}$ | ∞ | | | | |

$F_{1\cdot 2\cdot 3} = -158.900$
Backfocus = 179.002 where:

$r_1, r_2, \ldots r_{19}$ is the radius of curvature of each lens surface; $d_1, d_2, \ldots d_{18}$ is the lens thickness or the distance between the respective adjacent lenses; $N_1, N_2, \ldots N_{10}$ is the refractive index of each lens; $\nu_1, \nu_2, \ldots \nu_{10}$ is the Abbe number of each lens; and * is the face plate of the television camera tube.

2. A wide-angle lens system comprising nine lenses grouped in eight lens components, a first lens component including a negative meniscus lens convex toward the object, a second lens component including a positive meniscus lens concave toward the object, a third lens component including a negative meniscus lens convex toward the object, a fourth lens component including a positive cemented lens composed of a positive lens and a negative lens, a fifth lens component including a positive lens, a sixth lens component including a negative lens, a seventh lens component including a positive lens, and an eighth lens component including a positive lens wherein:

Aperture ratio 1:1.4 F=100 View angle 70.8°

| | | | | | |
|---|---|---|---|---|---|
| $r_1$ | 473.112 | $d_1$ | 15.96 | $N_1/\nu_1$ | 1.62230/53.2 |
| $r_2$ | 155.514 | $d_2$ | 108.65 | | |
| $r_3$ | −642.428 | $d_3$ | 47.93 | $N_2/\nu_2$ | 1.80518/25.4 |
| $r_4$ | −299.300 | $d_4$ | 49.98 | | |
| $r_5$ | 536.562 | $d_5$ | 35.54 | $N_3/\nu_3$ | 1.61800/63.4 |
| $r_6$ | 113.590 | $d_6$ | 132.26 | | |
| $r_7$ | 219.348 | $d_7$ | 61.40 | $N_4/\nu_4$ | 1.70514/41.2 |
| $r_8$ | −190.279 | $d_8$ | 14.00 | $N_5/\nu_5$ | 1.71736/29.5 |
| $r_9$ | −568.478 | $d_9$ | 25.52 | | |
| $r_{10}$ | 845.859 | $d_{10}$ | 48.65 | $N_6/\nu_6$ | 1.65830/53.4 |
| $r_{11}$ | −260.729 | $d_{11}$ | 16.50 | | |
| $r_{12}$ | −171.576 | $d_{12}$ | 13.51 | $N_7/\nu_7$ | 1.80518/25.4 |
| $r_{13}$ | 216.668 | $d_{13}$ | 18.85 | | |
| $r_{14}$ | 807.545 | $d_{14}$ | 37.74 | $N_8/\nu_8$ | 1.67790/55.3 |
| $r_{15}$ | −200.434 | $d_{15}$ | 1.23 | | |
| $r_{16}$ | 276.116 | $d_{16}$ | 37.45 | $N_9/\nu_9$ | 1.74400/44.7 |
| $r_{17}$ | −827.598 | $d_{17}$ | 61.40 | | |
| *{ $r_{18}$ | ∞ | $d_{18}$ | 20.88 | $N_{10}/\nu_{10}$ | 1.49782/66.8 |
| $r_{19}$ | ∞ | | | | |

$F_{1\cdot 2\cdot 3} = -155.786$
Backfocus = 179.381 where:

$r_1, r_2, \ldots r_{19}$ is the radius of curvature of each lens surface; $d_1, d_2, \ldots d_{18}$ is the lens thickness or the distance between the respective adjacent lenses; $N_1, N_2, \ldots N_{10}$ is the refractive index of each lens; $\nu_1, \nu_2, \ldots \nu_{10}$ is the Abbe number of each lens; and * is the face plate of the television camera tube.

3. A wide-angle lens system comprising nine lenses grouped in eight lens components, a first lens component including a negative meniscus lens convex toward the object, a second lens component including a positive meniscus lens concave toward the object, a third lens component including a negative meniscus lens convex toward the object, a fourth lens component including a positive cemented lens composed of a positive lens and a negative lens, a fifth lens component including a positive lens, a sixth lens component including a negative lens, a seventh lens component including a positive lens, and an eighth lens component including a positive lens wherein:

Aperture ratio 1:1.4 F=100 View angle 70.8°

| | | | | | |
|---|---|---|---|---|---|
| $r_1$ | 473.541 | $d_1$ | 15.96 | $N_1/\nu_1$ | 1.62230/53.2 |
| $r_2$ | 155.895 | $d_2$ | 108.13 | | |
| $r_3$ | −639.702 | $d_3$ | 51.44 | $N_2/\nu_2$ | 1.80518/25.4 |
| $r_4$ | −301.437 | $d_4$ | 52.10 | | |
| $r_5$ | 543.943 | $d_5$ | 35.46 | $N_3/\nu_3$ | 1.61800/63.4 |
| $r_6$ | 114.155 | $d_6$ | 131.33 | | |
| $r_7$ | 217.565 | $d_7$ | 77.41 | $N_4/\nu_4$ | 1.70514/41.2 |
| $r_8$ | −191.629 | $d_8$ | 14.00 | $N_5/\nu_5$ | 1.71736/29.5 |
| $r_9$ | −549.137 | $d_9$ | 14.15 | | |
| $r_{10}$ | 841.499 | $d_{10}$ | 43.48 | $N_6/\nu_6$ | 1.65830/53.4 |
| $r_{11}$ | −259.440 | $d_{11}$ | 10.96 | | |
| $r_{12}$ | −172.252 | $d_{12}$ | 21.32 | $N_7/\nu_7$ | 1.80518/25.4 |
| $r_{13}$ | 217.516 | $d_{13}$ | 22.13 | | |
| $r_{14}$ | 816.840 | $d_{14}$ | 37.61 | $N_8/\nu_8$ | 1.67790/55.3 |
| $r_{15}$ | −200.680 | $d_{15}$ | 1.23 | | |
| $r_{16}$ | 271.327 | $d_{16}$ | 37.20 | $N_9/\nu_9$ | 1.74400/44.7 |
| $r_{17}$ | −1152.429 | $d_{17}$ | 61.40 | | |
| *{ $r_{18}$ | ∞ | $d_{18}$ | 20.89 | $N_{10}/\nu_{10}$ | 1.49782/66.8 |
| $r_{19}$ | ∞ | | | | |

$f_{1\cdot 2\cdot 3} = -155.188$
Backfocus = 181.980 where:

$r_1, r_2, \ldots r_{19}$ is the radius of curvature of each lens surface; $d_1, d_2, \ldots d_{18}$ is the lens thickness or the distance between the respective adjacent lenses; $N_1, N_2, \ldots N_{10}$ is the refractive index of each lens; $\nu_1, \nu_2, \ldots \nu_{10}$ is the Abbe number of each lens; and * is the face plate of the television camera tube.

* * * * *